(12) United States Patent
Bollinger et al.

(10) Patent No.: US 7,045,057 B2
(45) Date of Patent: May 16, 2006

(54) PREPARATION OF HOMOGENEOUSLY LOADED ION EXCHANGERS

(75) Inventors: Mark A. Bollinger, Pittsburgh, PA (US); Chen-Chou Chiang, Wexford, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 35 days.

(21) Appl. No.: 10/411,900

(22) Filed: Apr. 11, 2003

(65) Prior Publication Data

US 2004/0204509 A1     Oct. 14, 2004

(51) Int. Cl.
*B01D 21/30*     (2006.01)

(52) U.S. Cl. ............ 210/140; 210/189; 210/268; 210/269; 210/284; 210/676; 210/691; 521/25; 521/26; 521/28; 521/29; 521/31

(58) Field of Classification Search ........... 210/189, 210/269, 284, 676, 691, 140, 268; 521/25, 521/26, 28, 29, 31
See application file for complete search history.

(56) References Cited

U.S. PATENT DOCUMENTS

| | | | | |
|---|---|---|---|---|
| 2,815,322 A | * | 12/1957 | Higgins | 210/676 |
| 3,231,492 A | | 1/1966 | Stine et al. | |
| 3,382,277 A | * | 5/1968 | Pick | 562/87 |
| 3,406,113 A | * | 10/1968 | Anderson | 210/674 |
| 3,522,002 A | * | 7/1970 | Lefevre | 423/139 |
| 3,557,082 A | * | 1/1971 | Bridgeford | 536/61 |
| 3,756,919 A | * | 9/1973 | Deaton | 127/40 |
| 4,182,633 A | * | 1/1980 | Ishikawa et al. | 127/46.2 |
| 4,385,993 A | * | 5/1983 | Hedrick et al. | 210/675 |
| 4,478,721 A | * | 10/1984 | Gerhold | 210/659 |
| 4,661,258 A | * | 4/1987 | Phillips | 210/661 |
| 4,693,818 A | * | 9/1987 | Terrien et al. | 210/189 |
| 4,764,276 A | * | 8/1988 | Berry et al. | 210/264 |
| 4,923,616 A | * | 5/1990 | Hirata et al. | 210/676 |
| 5,064,539 A | * | 11/1991 | Tanimura et al. | 210/659 |
| 5,126,056 A | * | 6/1992 | Carlson | 210/676 |
| 5,676,826 A | | 10/1997 | Rossiter et al. | |
| 6,218,327 B1 | | 4/2001 | Leavitt | |
| 6,431,202 B1 | * | 8/2002 | Ahlgren et al. | 137/312 |
| 6,518,454 B1 | * | 2/2003 | Arumugam et al. | 560/265 |
| 6,716,344 B1 | * | 4/2004 | Bassi et al. | 210/189 |

* cited by examiner

*Primary Examiner*—Bernard Lipman
(74) *Attorney, Agent, or Firm*—Christine W. Trebilcock, Esq.; Cohen & Grigsby, P.C.

(57) ABSTRACT

A process for preparing an ion-exchangeable media within a moving-bed or simulated moving-bed device, which can create a true or simulated media flow, comprising the steps of packing the bed with ion-exchangeable media and passing a solution, containing a mixture of ionic species, through the media, wherein the solution is passed partly or completely counter-current to the media flow direction such that the ionic species are loaded to a desired level upon equilibration.

15 Claims, 3 Drawing Sheets

PREPARATION OF HOMOGENEOUSLY LOADED ION EXCHANGERS

FIELD OF THE INVENTION

This invention relates to the preparation of ion-exchangeable media and more particularly to the homogeneous loading of ionic species onto an ion-exchangeable media within a continuous contacting device.

BACKGROUND OF THE INVENTION

Ion-exchangeable media are frequently employed in chromatography, ion exchange, and catalyst applications. Ion-exchangeable media are solid phase or gel-type materials that contain ion-exchange sites that carry ion-exchangeable cations or anions. The form of the ion-exchangeable media, which refers to the type and quantity of ion-exchangeable cations or anions carried by the media, provides certain unique properties to the media that impart unique functionality to the media. For example, ion-exchange resins in calcium form have unique properties for chromatographic separation of sugars, zeolites containing transition metals have been used as catalysts, and ion-exchange resins in silver form have been used to separate certain hydrocarbons. Although there is a broad spectrum of ion-exchangeable media with many unique properties, only a limited number of ion-exchangeable media forms are available commercially, such as sodium, calcium, potassium, and hydrogen form cation-exchange media and chloride and hydroxide form anion-exchange media. Ion-exchangeable media containing a specific concentration of species, such as 5% calcium or 10% silver are not readily available and, as such, the process of the invention provides a means to convert commercially available forms of ion-exchangeable media to a specific form for a specific application.

The goal of the preparation is to change the media from a standard, commercially available form to a specialty form with a particular usefulness as a processing media. The usefulness of the media is determined by its applicability to separate, purify, or react compounds within the context of an adsorption or catalytic type process. Various forms of ion-exchangeable media can be prepared by traditional means in batch mode. Batch mode means a batch process, as opposed to a continuous process, and is inherently a multi-step processes. Two types of batch mode operations that may be employed are fixed-bed and stirred tank. In the fixed bed approach, one or more static vessels are packed with media and a solution is passed through the media until the media is equilibrated with the solution. In the stirred tank approach, a mixture of media and solution are contacted in a vessel equipped with a mechanism for stirring to establish mixing between the media and the solution. In the stirred tank method, solution and media are mixed until equilibrium is attained. The traditional batch methods suffer from several limitations including inefficiencies, which require a large stoichiometric excess of solution to reach equilibrium throughout the length of the bed. In these batch processes, the waste could be as much as 60% of the total solution used in the process. Thus, more chemicals are consumed and more waste is generated, leading to significant added expense. The added expense of these inefficiencies can significantly impact the feasibility of a commercial process, particularly where these chemicals are expensive, such as the case when precious metals are employed. Another limitation is that the batch methods are inherently multi-stage processes where equilibration and rinse stages must be conducted sequentially, leading to further inefficiency and longer operation time. Another limitation is that large vessels are required. The stirred tank has the additional limitation that repeated batches are likely required to reach the desired media composition at equilibrium. The stirred tank method also suffers from media attrition, due to repeated contact between the stirring mechanism and the media and long equilibration time.

In a large scale commercial process, in which expensive raw materials, such as precious metals, are being used to prepare the media, the efficiency of the preparation process is very important to the overall process economics. As a means of alleviating the limitations of the traditional methods, the current invention provides a process of increasing production yield by more efficiently utilizing the incoming solution so that the total quantity of chemicals required to reach equilibrium is decreased and effluent waste is decreased. Accordingly, it is an object of an embodiment of the invention to provide an efficient process for preparation of ion-exchangeable media where particular ionic compositions (loadings) are prepared. In an embodiment it is an object to provide a process for modification of the ionic composition of an ion-exchangeable media in an efficient manner within a continuous contacting device. Another object of an embodiment is to prepare media in-situ, within the final processing equipment itself, such that separate preparation, transportation, and filling are not needed. Another object of an embodiment is to prepare media using the continuous contacting device that is homogeneous from column-to-column, within each column, and that is reproducible from one preparation to the next. A still further object in an example of the invention is to provide a process that is readily adaptable to commercial operation.

SUMMARY OF THE INVENTION

In general, the present invention provides a process for preparing an ion-exchangeable media within a moving-bed or simulated moving-bed device, comprising the steps of packing the device with ion-exchangeable media, and passing a solution, containing a mixture of ionic species, through the media, partly or completely counter-current to the media flow direction. The solution is flowed counter-currently to the media so that the media becomes equilibrated in an efficient manner and the solution is fully utilized. The total quantity of chemicals required to reach equilibrium is decreased and the effluent waste is decreased. A wash or a rinse zone may be introduced into the process to further minimize waste resulting from the entrained solution. The present process equilibrates and rinses the media in a single stage to improve efficiency and save preparation time. This allows the entrained electrolyte solution to be recovered by the rinse and used to pre-equilibrate the media which has not yet been equilibrated. The process can utilize counter-current contacting in the rinse zone to reduce the amount of rinse solvent required and reduce dilution of the waste stream. Further, the continuous counter-current process is advantageous to the traditional batch process in that it is easy to control, convenient, more robust, and prepares the desired media homogeneously and immediately ready for use.

The media flow direction is established either by the rotation of columns containing media or by the movement of inlet and outlets ports to a series of fixed columns coordinated such that the media has an apparent or simulated flow. In either case, the media itself does not flow within the column that contains it. Simulated moving-bed devices are also known as moving port devices because they simulate the movement of the media relative to the flow of the solution by controlling the solution flow by means of selectively opening and closing inlet and outlet ports which direct flow to the columns. The selective opening and closing of ports may be accomplished by multiple two-way shut off valves which direct the fluid flow or through the use of a single rotary valve. The device may consist of multiple columns or a single column divided into multiple compartments. Another type of continuous-contacting device is a moving-bed device, such as ISEP® available from Calgon Carbon Corporation, in which multiple columns are interconnected and arranged in a circular fashion and a single multi-port rotary valve directs flow to the columns. In this case, the columns, and thus the media inside the columns, move in a circular, step-wise fashion.

The ion-exchangeable media is packed into a simulated moving-bed or continuous-contacting device, such as simulated moving-bed or multi-column devices, by traditionally accepted means such that the media is added to the column in a gradual manner such that a reasonably uniform distribution of particles is achieved.

The media is prepared such that the desired ionic composition is achieved upon equilibration with the electrolyte solution. Electrolyte solution is a liquid containing ionic constituents dissolved within. The solution used to prepare the media can be any electrolyte solution, that is, any solution containing ionic species. To provide sufficient solubility for ionic species, the solution is generally prepared from a polar solvent, such as by dissolving ionic compounds in water. In an example the ionic compounds have relatively low cost, low toxicity, and high solubility such as most nitrate and chloride salts. High solubility is preferred since it is preferable to have high concentrations of the ionic constituents in the solution. In an example, the ionic constituent concentrations are 1–2 mole equivalents of total exchangeable ions per liter of solution, where the high concentrations are desired to minimize the waste volume and increase the kinetic driving force in the ion-exchange process.

The electrolyte solution is prepared by adding and dissolving ionic compounds in a solvent, such as for example water. The quantity and type of such compounds depends on the media composition that is desired. For example, if the desired media were 5% calcium and the remainder of sodium, then an electrolyte containing calcium chloride (or other soluble calcium salts) and sodium chloride (or other soluble sodium salts) would be used. The concentrations of the salts are determined such that the ion concentrations produce the desired ionic composition on the media after the media is equilibrated with the solution. These ion concentrations can be determined experimentally by passing various solution compositions through a test column until the desired ionic composition on the media is obtained. This is experimentally adjusted until various selected ion compositions are equilibrated with the media. The media is analyzed to determine its composition. The ion compositions in solution are chosen when they produce the desired media composition. An alternative approach is to calculate the desired ion compositions from an isotherm equation that describes the ion-exchangeable media composition as a function of the solution composition. The isotherm equation can be determined by equilibrating the media in solutions containing various concentrations of the ionic species and determining the composition of the media and solution upon equilibration. These data can be statistically regressed to an appropriate isotherm equation, such as a Langmuir or Mass-Action, to determine an empirical relationship between the solution composition and the media composition. If the above information is not available or easily attained, frequently the total ion-exchange capacity and selectivity of the ions of interest is available from the media manufacturer or from reference books. From this information, a mass-action isotherm equation can be used to provide an estimate of the relationship between the solution composition and media composition.

Unlike the traditional fixed bed or stirred tank approach to preparing a new form of the ion-exchangeable media, the method of the present invention utilizes at least two or more columns connected in series and uses the movement or simulated movement of the media to provide countercurrent contacting between the solution and the media. The preparation of ion-exchangeable media with the continuous contacting device reduces the quantity of ionic chemicals and solvents required to prepare a given media and produce a smaller and less dilute waste stream than the traditional fixed column approach. Further, the process has significant advantages for preparing media when the application of the media is incorporated with the operation of the same continuous contacting device since the media is prepared homogeneously within the device itself and the need to transport the media from the preparation device to the operating device is eliminated.

A further advantage of the invention is realized when a rinsing solvent is introduced into the process such that media which has been equilibrated with the electrolyte solution can be immediately rinsed to remove the entrained electrolyte solution. The rinse solvent should contain a minimum of ionic species to avoid changing the composition of the media after it has been equilibrated with the electrolyte solution to the desired final composition. In an example, the rinse solvent is introduced and passed through two or more columns in series, countercurrent to the movement or simulated movement of the media which creates an effective rinsing zone which removes the entrained electrolyte solution and, optionally, recycles it back into the process. The rinse functions to remove the entrained electrolyte solution, which remains in the column, both solution outside the media and within the pore structure of the media, after the equilibration stage. The rinse effluent may be passed through media, which has not yet been fully processed so as to minimize the loss of the valuable ionic constituents in the entrained fluid. In the batch processes, since the rinse is conducted subsequent to the equilibration stage, all of the entrained solution is lost to waste. In the continuous process of the invention, the effluent from the rinse is not wasted, but recycled back into the process.

This method can be applied using any media that is partly or completely comprised of an ion-exchange material. The media could contain fillers or binders that are not ion-exchange material. Said ion-exchange material comprises any insoluble solid material which carries exchangeable cations or anions that can be exchanged with a stoichiometrically equivalent amount of other ions of the same sign when the ion exchanger is in contact with an electrolyte solution. The most common ion-exchange materials are ion-exchange resins, ion-exchange coals, and natural and synthetic inorganic ion exchangers. Of particular interest are sulfonated styrene-divinylbenzene and acrylic resin beads and aluminosilicate materials such as zeolites and alumina modified silica gel. In an example, the media is about 0.02 mm to 2 mm in diameter.

In another embodiment, the present invention provides a process for modifying the ionic composition of an ion-exchangeable media in an efficient manner. The process utilizes a continuous contacting device, operated in a multiple-column, counter-current mode. The counter-current operation implies a minimum of two columns being connected in series through which the electrolyte solution is passed to equilibrate with the media. In this case, either the media is moved counter-current (opposite flow direction) to the solution or the solution flow is manipulated to simulate a counter-current movement of the media. The larger the number of columns employed, the greater the efficiency of the operation for preparing the media; however, a practical and useful number of columns is three or four. The process could conceivably incorporate both series and parallel flow, but the efficiency relies on having at least two columns in series, operated in a counter-current fashion.

In another embodiment, media is prepared in-situ, within the final processing equipment, therefore eliminating the need for separate preparation equipment, transportation and filling. When prepared media will be used in a continuous-contacting device, it is advantageous to prepare the media within the same device itself. The media is homogeneously prepared, and there is no need to remove the media to homogenize it. Further, preparing media within the commercial processing equipment eliminates the need to transport the media from one processing equipment to another resulting with cost savings and minimizing the chance of damaging the media during transportation.

Media is prepared using the continuous contacting device so that it is homogeneous from column-to-column, and within each column, and so that it is reproducible from one preparation to the next. Since the ion-exchange process is an equilibrium process, the media can be prepared inside the multi-column device while providing the required homogeneity within each column and from column-to-column. The media homogeneity is necessary for satisfactory use in a chromatographic or catalytic process.

The present process is readily adaptable to commercial operation. Commercially available equipment, such as ISEP®, can be adjusted to efficiently prepare the media and subsequently perform continuous operations using the media.

In one embodiment of the present method, ionic concentrations in the solution are adjusted to control the equilibrium concentrations of ions on the resin. The composition of the ionic constituents on the media upon equilibration with an electrolyte solution will be determined by the total ion-exchange capacity of the media and the selectivity, i.e. affinity of the media for each of the ionic components, of the media. By varying the relative concentrations of the ions in the electrolyte solution, various media compositions can be prepared and the composition of the electrolyte solution can be manipulated to prepare a media with a desired composition of ionic constituents. That is, a composition which provides the desired property of the media for the application. For some chromatography applications, the quantity of a particular species on the media will affect the retention time of the component and thus the retention time can be readily manipulated. The control of the ionic concentrations of the resin to the optimum level can have a significant effect on the cost of the media and the solvent requirements for the process, thereby significantly affecting the overall process cost and performance.

In another embodiment, a continuous contacting device, containing multiple columns, such as simulated moving-bed or ISEP® (U.S. Pat. No. 6,431,202) equipment is used to prepare the ion-exchangeable media in-situ. In this aspect, the ionic solution is flowed counter-currently to the movement (or simulated movement) of the media such that the media becomes equilibrated in an efficient manner, which minimizes chemical consumption and waste. The multi-column, counter-current mode of operation is more efficient than the single fixed bed approach, requiring a smaller quantity of chemicals and generating less waste. This is particularly important when the preparation is carried out using electrolyte solutions containing valuable components, such as salts of silver or platinum, which would be costly to discard and recover. Using multi-column, counter-current contacting reduces the amount of resin in the mass transfer zone, the portion of the media bed where equilibrium has not been established and actual transfer of the ionic species is taking place. Waste is generated between the time that the front edge of the mass transfer zone reaches the end of the bed and the trailing edge reaches the end of the bed. Because the multi-column, counter-current system has less resin in the mass transfer zone, the volume of waste generated is reduced.

In an embodiment of this invention, any number of columns connected in series, such as for example 2 to 5 columns, as part of the process, may be used as rinsing columns. These rinsing columns may be collectively referred to as a rinsing zone. The rinsing zone typically has one or more inlets where the clean rinsing solvent is introduced and one or more outlets where the rinsing effluent exits the rinsing zone. The rinsing zone is located in the process such that media enters the rinsing zone after it is equilibrated with the electrolyte solution. The rinsing zone then functions to remove the entrained electrolyte solution from the column. In an example, the rinsing effluent is recycled back into the process to pre-load the ion-exchangeable media that has not yet reached the final equilibration stage, providing further minimization of chemical usage and waste. In an example, the rinsing solvent is delivered to the process simultaneously with the delivery of the electrolyte solution, although the delivery of the rinsing solvent to the process may be conducted partly or completely after the equilibration process. The rinsing solvent is delivered such that any column in the process containing media equilibrated with the electrolyte solution is contacted only by clean solvent to avoid altering the final equilibrium state of the media. The rinsing process is conducted with a solvent that is relatively free of ionic constituents and that is miscible with the solvent used to prepare the electrolyte solution. In an embodiment, the rinse is de-ionized water.

In another embodiment of this invention, any number of columns connected in parallel or in series, such as for example 1 to 3 columns, as part of the process may be used as solvent conversion columns. These solvent conversion columns may be collectively referred to as a solvent conversion zone. The solvent conversion zone is located in the process such that media enters the solvent conversion zone after it has been rinsed. The solvent conversion zone then functions to remove the entrained rinse solvent from the column and replace it with the appropriate solvent for the process such that the final prepared media is ready for use in the process. In an example, where the process solvent is miscible with the rinsing solvent, the process solvent is delivered to the process simultaneously with the delivery of the rinsing solvent, thereby displacing the rinsing solvent during the process. In an example, where the process solvent is not miscible with the rinsing solvent, an intermediate conversion solvent which is miscible with the rinsing solvent and process solvent is introduced such that the intermediate conversion solvent displaces the rinsing solvent and the process solvent is introduced to displace the intermediate conversion solvent. Additional intermediate conversion solvents may be introduced as needed to maintain miscibility from one solvent to the next in order to replace the rinsing solvent with the process solvent. The process is conducted with process and intermediate conversion solvents that are relatively free of ionic constituents to preserve the ionic composition of the media.

In an example of this invention, the electrolyte solution is passed through one or more fixed bed columns before introduction to the multiple column device to provide additional homogeneous media to top-off the media chambers as needed due to settling or shrinkage of the beds or to provide a spare media inventory. Alternatively, the media chambers are removed after equilibration and rinsing and replaced by media chambers containing untreated media and thereby prepare additional media for this same purpose. Other features, aspects and advantages of the present invention will become better understood from perusal of the following detailed description and examples of the invention and appended claims.

DESCRIPTION OF ExampleS OF THE INVENTION

Example 1

Calcium Form Resin

Figure 1:
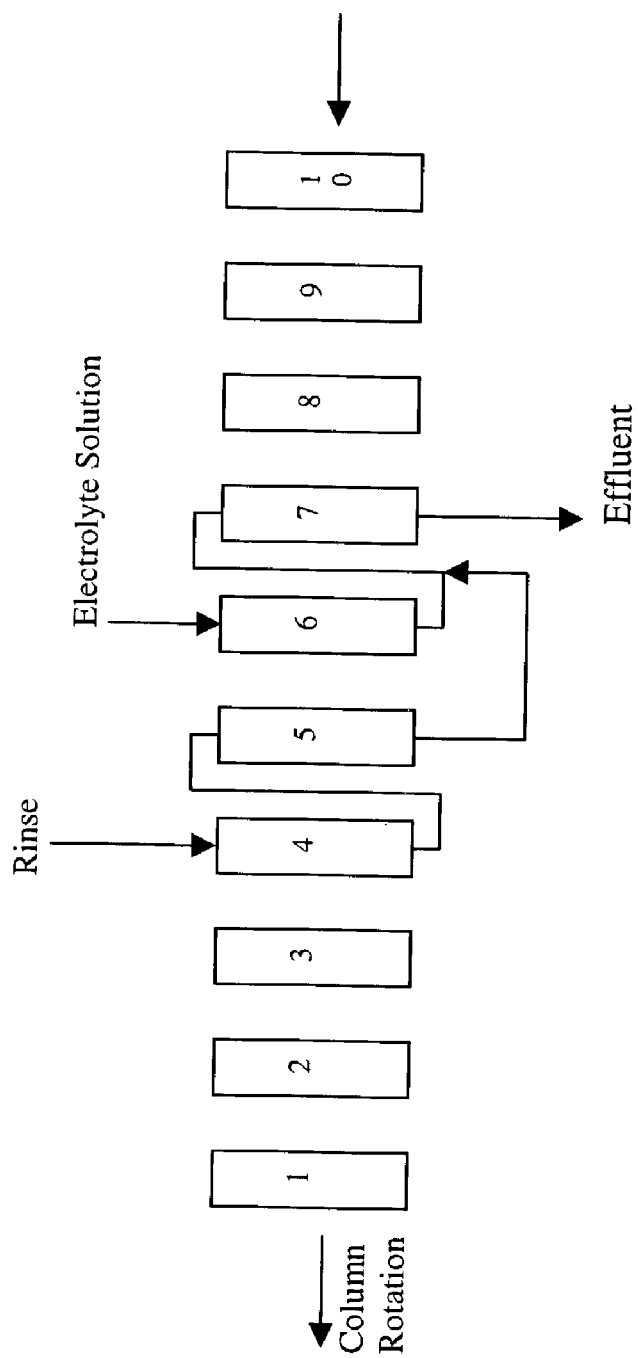
FIG. 1 is a schematic representation of an embodiment of the prevent invention.

A 10-column continuous contacting moving-bed device was used. The moving-bed device consists of 10-columns affixed to a rotating platform and a central rotary valve. The rotary valve provides ten fixed ports that accept the inlet and outlet process streams. The relative location of inlet and outlet streams and the interconnectivity of the columns are shown in FIG. 1. Port positions are labeled on the figure from one to ten. The assignment of port numbers to the port positions is arbitrary, but is shown in the figure to indicate the relative position of the inlet, outlet, and column-to-column connectivity. The columns rotate step-wise through each port position on a specified time interval called the switching time. Although the system contains 10 columns, fluid is flowing through only those columns in port positions 4 to 7 at any given time. The rinsing solvent is introduced at port 4, which is connected in series to port 5. Thus, ports 4 and 5 form a two-column counter-current rinsing zone. The electrolyte solution is introduced at port 6, which is connected in series to port 7 to form a two column equilibration zone. Thus, ports 6 and 7 are used to equilibrate the resin with the electrolyte solution.

The columns were packed with beads comprising Mitsubishi UBK-550 resin, a commercially available polystyrene-DVB, gel-type, strong-acid cation exchanger in sodium form. The resin beads were about 220 microns in diameter. The columns were 11 mm ID×300 mm length, such that the system contained 285 mL total resin volume. An electrolyte solution was prepared by adding calcium chloride dihydrate and sodium chloride to deionized water such that the final solution contained 14.7 g/L calcium ions and 26.7 g/L sodium ions. This solution was pumped into port #6 at a rate of 2.4 mL/min. The rinsing solvent was de-ionized water and was introduced into the system at port #4 at a rate of 4.8 mL/min. The columns were rotated with a switching time of 30 minutes so that 792 mL was passed through the columns, sufficient to reach equilibrium. Only the very first step had a switching time of 60 minutes to allow an inventory of ionic species to build up in the system.

At the end of the process, resin in the top of each column was analyzed to demonstrate the column to column consistency and resin in the top, middle, and bottom of the second, fifth, and eighth columns was analyzed to demonstrate consistency within the length of each of those columns. These results, shown in Tables 1 and 2 show the uniformity of the composition of the final prepared media.

TABLE 1

Column-to-column uniformity of calcium-containing media.

| Column | wt % Ca |
|---|---|
| 1 | 4.7 |
| 2 | 4.6 |
| 3 | 4.6 |
| 4 | 4.6 |
| 5 | 4.6 |
| 6 | 4.6 |
| 7 | 4.6 |
| 8 | 4.6 |
| 9 | 4.6 |
| 10 | 4.6 |

TABLE 2

Intra-column uniformity of calcium-containing media.

| | Col 2 wt % Ca | Col 5 wt % Ca | Col 8 wt % Ca |
|---|---|---|---|
| Top | 4.6 | 4.6 | 4.6 |
| Middle | 4.6 | 4.6 | 4.6 |
| Bottom | 4.6 | 4.6 | 4.6 |

Example 2

Silver Form Resin

Figure 2:
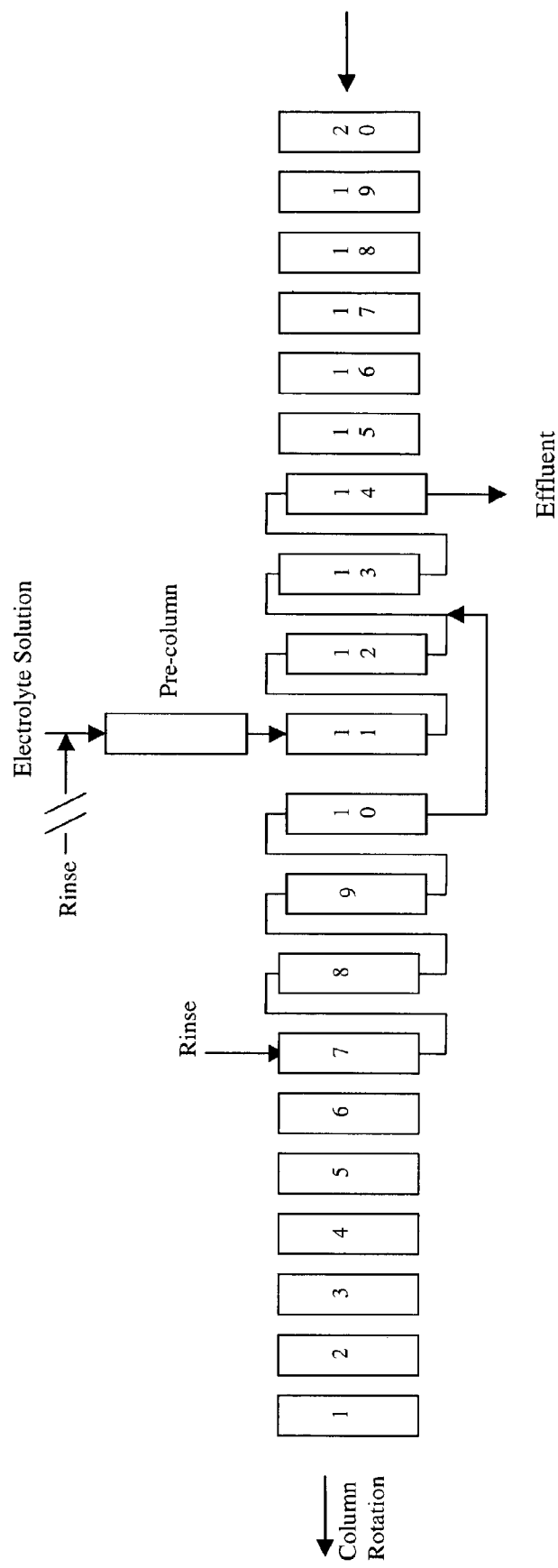
FIG. 2 is a schematic representation of another embodiment of the present invention.

A 20-column version of the continuous contacting moving-bed device described in Example 1 was used. The location of inlet and outlet streams and the interconnectivity of the columns are shown in FIG. 2. Although the system contains 20 columns, fluid is flowing through only those columns in port positions 7 to 14 at any given time. The rinsing solvent is introduced at port 7 and ports 7 to 10 are connected in series to form a four-column counter-current rinsing zone. The electrolyte solution is introduced at port 11 and ports 11 to 14 are connected in series to form a four-column counter-current equilibration zone where the change in media composition occurs. A pre-column was used to prepare additional resin inventory.

The 20 columns were packed with Dowex Marathon MSC resin, a polystyrene-DVB, macroporous-type, strong-acid cation exchanger in sodium form. The resin beads were about 500 microns in diameter. The columns were 11 mm ID×600 mm length, such that the system contained 1140 mL total resin volume. An electrolyte solution was prepared by adding silver nitrate and sodium nitrate to deionized water such that the solution contained 8.1 g/L of silver ions and 12.8 g/L of sodium ions. This solution was pumped into port

11 at a rate of 5.2 mL/min. A clean, de-ionized water rinse was fed to the system at 5.0 mL/min. The columns were rotated with a switching time of 130 minutes.

At the end of the process, the silver composition of the resin in the top, middle, and bottom of the fifth, tenth, and fifteenth columns was determined. The uniformity of the media prepared by this process is shown in Table 3. In addition, the total quantity of silver in the effluent stream was analyzed to demonstrate the efficiency of the process to produce minimal waste. As a percentage of the total silver ions input into the process, the amount of waste was 1.2%.

TABLE 3

Uniformity of silver-containing media.

|  | Col 5 wt % Ag | Col 10 wt % Ag | Col 15 wt % Ag |
|---|---|---|---|
| Top | 14.2 | 14.3 | 14.3 |
| Middle | 14.1 | 14.2 | 14.2 |
| Bottom | 14.1 | 14.2 | 14.1 |

Example 3

Silver Form Resin

Figure 3:
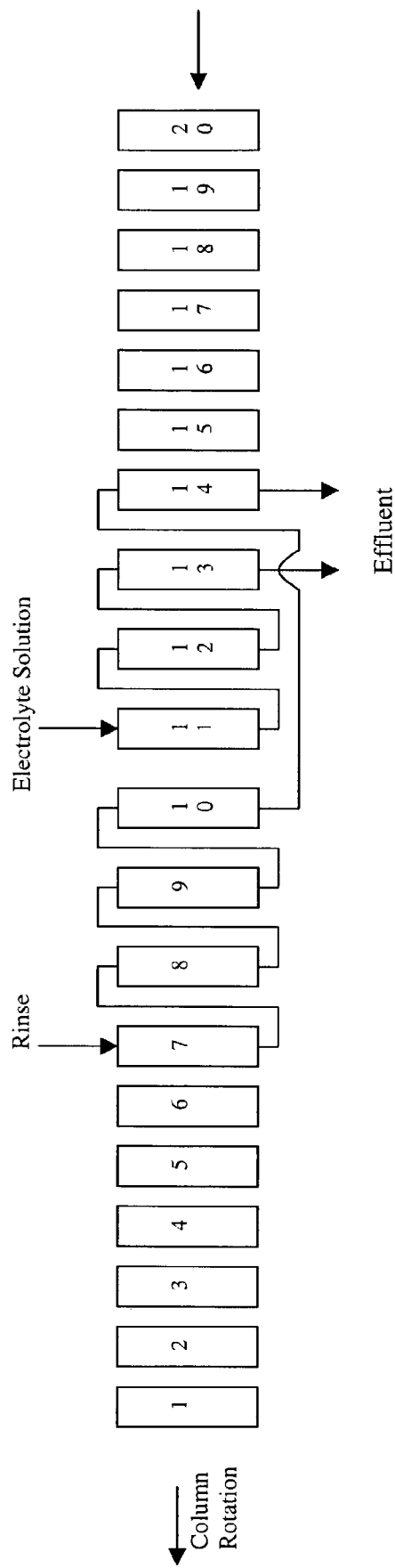
FIG. 3 is a schematic representation of another embodiment of the present invention.

A 20-column version of the continuous contacting moving-bed device described in Example 1 was used. The location inlet and outlet streams and the interconnectivity of the columns are shown in FIG. 3. Although the system contains 20 columns, fluid is flowing through only those columns in port positions 7 to 14 at any given time. The rinsing solvent is introduced at port 7 and ports 7 to 10 are connected in series to form a four-column counter-current rinsing zone. The electrolyte solution is introduced at port 11 and ports 11 to 14 are connected in series to form a four-column counter-current equilibration zone where the change in media composition occurs.

The 20 columns were packed with Dowex Marathon MSC resin as in example 2. In this example, no precolumn was used, but additional spare resin was prepared by removing the first five columns after they were loaded and rinsed and replacing them with untreated resin. The columns were 37 mm ID×1000 mm length, such that the system contained a 22 L of resin and 5.5 L of additional spare resin was prepared. An electrolyte solution was prepared by adding silver nitrate and sodium nitrate to deionized water such that the solution contained 8.1 g/L silver ions and 13.1 g/L sodium ions. This solution was pumped into port #11 at a rate of 100 mL/min. A lean, de-ionized water rinse was fed to the system at 100 mL/min. The columns were rotated with a switching time of 130 minutes. The switching time for the first step was 260 minutes to provide an inventory of silver in the equilibration zone, which drives the process closer to true equilibrium.

At the end of the process, the resin was removed from the columns and analyzed to determine the uniformity of its composition. First, resin in the top, middle, and bottom of three of the columns was analyzed to demonstrate the uniformity of the media within each column. Next, resin from the top of all 20 columns was analyzed to demonstrate the column-to-column uniformity of the media composition. The uniformity of the silver composition is shown in Tables 4 and 5.

TABLE 4

Uniformity of silver-containing media after scale-up.

|  | Col 6 wt % Ag | Col 10 wt % Ag | Col 15 wt % Ag |
|---|---|---|---|
| Top | 14.0 | 14.1 | 14.2 |
| Middle | 14.0 | 14.0 | 13.7 |
| Bottom | 13.8 | 14.0 | 14.2 |

TABLE 5

Column-to-column uniformity of silver media.

| Column | wt % Ag |
|---|---|
| 1 | 13.8 |
| 2 | 13.7 |
| 3 | 14.1 |
| 4 | 14.0 |
| 5 | 14.2 |
| 6 | 14.1 |
| 7 | 14.2 |
| 8 | 14.2 |
| 9 | 14.5 |
| 10 | 14.5 |
| 11 | 14.4 |
| 12 | 13.3 |
| 13 | 14.2 |
| 14 | 13.9 |
| 15 | 14.1 |
| 16 | 14.1 |
| 17 | 14.2 |
| 18 | 14.2 |
| 19 | 14.1 |
| 20 | 14.1 |

The examples demonstrate the effectiveness of the method for preparing media with a uniform distribution of ionic components on the ion-exchangeable sites, where the media is homogeneous in composition from column-to-column and within each column. The examples further demonstrate that the process is applicable to various types of ion-exchangeable media and various electrolyte solution compositions. The examples also demonstrate various configurations can be utilized with the scope of the process to prepare the media. It is fully expected that the process can be applied to various types of ion-exchangeable media and various electrolyte solution compositions. It is also expected that the process can be readily scaled to commercial systems of any size.

While the foregoing has been set forth in considerable detail, the examples and methods are presented for elucidation and not limitation. It will be appreciated from the specification that various modifications of the invention and combinations of elements, variations, equivalents, or improvements therein may be made by those skilled in the art, and are still within the scope of the invention as defined in the appended claims.

What is claimed is:

1. A continuous or substantially continuous process for preparing a substantially homogenous ion-exchangeable media within a moving-bed or simulated moving-bed device that creates a media flow or simulated media flow, said process comprising the steps of
    (a) packing said bed with ion-exchangeable media containing a first ionic species,
    (b) directing a solution through said media at least partly counter-current to said media flow, wherein said solution contains a second ionic species, or said first ionic species and a second ionic species, whereby said ionic species are loaded to a desired level upon equilibration onto said media, and (c) directing a rinse into said media flow.

2. A process for preparing an ion-exchangeable media as set forth in claim 1, wherein said moving-bed device is a multiple-column contacting device.

3. A process for preparing an ion-exchangeable media as set forth in claim 1, wherein said second ionic species is loaded onto said media to a concentration level of at least 0.1 wt % of said media weight.

4. A process for preparing an ion-exchangeable media as set forth in claim 1, wherein said second ionic species are loaded up to equilibrium capacity.

5. A process for preparing an ion-exchangeable media as set forth in claim 1, wherein said first and second ionic species includes species of cationic or anionic character.

6. A process for preparing an ion-exchangeable media as set forth in claim 1, wherein said ion-exchange media containing a first ionic species is about 0.02 mm to 2 mm in diameter.

7. A process for preparing an ion-exchangeable media as set forth in claim 2, wherein said contacting device is used with a fluid-directing multiport rotary valve.

8. A process for preparing an ion-exchangeable media as set forth in claim 1 wherein said rinse comprises a solvent having a low ionic content and is miscible with said solution.

9. A process for preparing an ion-exchangeable media as set forth in claim 1 further including a step (d) including a solvent conversion step wherein said rinse is replaced with a second process solution.

10. A process for preparing an ion-exchangeable media as set forth in claim 1 wherein said steps can be conducted sequentially or concurrently.

11. A process for preparing an ion-exchangeable media as set forth in claim 1, further including a step (d) of extracting said rinse as effluent and introducing said effluent into said media flow.

12. A process for preparing an ion-exchangeable media as set forth in claim 1, wherein said ion-exchangeable media is an inorganic solid containing sites capable of exchanging cations or anions.

13. A process for preparing an ion-exchangeable media as set forth in claim 12, wherein said inorganic solid is a zeolite or alumina-modified silica.

14. A continuous or substantially continuous process for preparing a substantially homogenous ion-exchangeable media within a moving-bed or simulated moving-bed device that creates a media flow or simulated media flow, said process comprising the steps of (a) packing said bed with ion-exchangeable media containing a first ionic species, (b) directing a solution through said media at least partly counter-current to said media flow, wherein said solution contains a second ionic species, or said first ionic species and a second ionic species, whereby said ionic species are loaded to a desired level upon equilibration onto said media, and c) directing a rinse into said media flow. wherein said media comprises polymeric beads, functionalized to contain sites capable of exchanging cations or anions.

15. A process for preparing an ion-exchangeable media as set forth in claim 14, wherein said polymeric beads are sulfonated styrene-divinylbenzene resin or acrylic resin in a cationic or anionic form.

* * * * *